US006025760A

United States Patent [19]

Tang

[11] Patent Number: 6,025,760

[45] Date of Patent: Feb. 15, 2000

[54] TOOL FOR SHUNTING A CABLE MULTI-TAP

[76] Inventor: Danny Q. Tang, 2 Taylorr Lake Ct., Manalapan, N.J. 07726

[21] Appl. No.: 09/071,563

[22] Filed: May 1, 1998

[51] Int. Cl.[7] ................................ H01P 5/12; H01P 1/26; H04N 7/10; H01R 13/24

[52] U.S. Cl. .......................... 333/100; 333/124; 333/127; 333/118; 333/22 R; 333/24 R; 333/185; 333/260; 348/6; 439/482; 439/700; 439/824

[58] Field of Search ................................ 333/100, 22 R, 333/24 R, 167, 181, 185, 118, 121, 124, 123, 125, 127, 32, 129–131, 136, 260; 348/6; 439/447, 448, 507, 510, 513, 578, 597, 816, 817, 908, 557, 700, 824, 219, 482

[56] References Cited

U.S. PATENT DOCUMENTS

| | | | |
|---|---|---|---|
| 3,308,420 | 3/1967 | Fitzgerald | 439/700 |
| 3,416,125 | 12/1968 | Theve | 439/700 X |
| 3,881,160 | 4/1975 | Ross | 333/127 X |
| 3,895,318 | 7/1975 | Ross | 333/136 |
| 4,281,888 | 8/1981 | Seaman | 439/824 X |
| 4,755,776 | 7/1988 | Preschutti | 333/132 X |
| 5,058,198 | 10/1991 | Rocci et al. | 333/24 R X |
| 5,581,134 | 12/1996 | Romerein et al. | 333/127 R X |
| 5,581,801 | 12/1996 | Spriester et al. | 455/3.3 |
| 5,648,745 | 7/1997 | Spriester et al. | 333/24 R X |
| 5,677,578 | 10/1997 | Tang | 333/127 X |
| 5,756,935 | 5/1998 | Balanovsky et al. | 333/100 X |
| 5,814,905 | 9/1998 | Tang | 333/101 X |
| 5,850,165 | 12/1998 | Spriester et al. | 333/136 X |
| 5,909,154 | 6/1999 | Brown et al. | 333/24 R X |
| 5,920,239 | 7/1999 | Hardy et al. | 333/100 |

*Primary Examiner*—Robert Pascal
*Assistant Examiner*—Barbara Summons
*Attorney, Agent, or Firm*—Watov & Kipnes, P.C.

[57] ABSTRACT

A tool is described for shunting a multi-tap for an RF cable system by connecting a low-pass filter between an unused input port and an unused output port of the multi-tap. The components of the filter are such as not to interfere with the circuits of the multi-tap when both are in the circuit. A light is provided for indicating when the tool is in operative position.

16 Claims, 17 Drawing Sheets

TOOL FOR SHUNTING A CABLE MULTI-TAP

FIELD OF THE INVENTION

The present invention relates generally to devices for shunting a cable TV multi-tap, and more particularly to a tool for providing such shunting with minimal signal disturbance.

BACKGROUND OF THE INVENTION

The field of the present invention relates generally to cable television and RF signal distribution equipment, and more specifically to multi-taps.

In cable TV and other RF distribution systems it is typically necessary to tap off a television or RF signal from a main distribution cable for bringing the television or RF signal into a customer facility on a secondary cable. The signal tapped off is generally substantially attenuated through use of a signal tapping device. A known device for accomplishing this is a multi-tap, that permits connection to the main television or RF signal carrying cable, and provides multiple outputs for individual connection to a number of customers, respectively. In a typical cable television distribution system, a plurality of multi-tap devices are connected as required along the length of a main signal line for tapping and distributing television signals to a plurality of the customers located in a vicinity of the areas where the main cable is strung. In such an installation, it is common practice to pass the main cable into one multi-tap at an input port thereof, and to continue the main cable from an output port of the multi-tap for connection to the input port of the next multi-tap down line. As more customers are added to the system, it may be necessary to lengthen the line, and/or to increase the level of power of the main television signal being conducted by the main cable. It is also typical to have the main distribution cable conduct both the television or RF signal along with the AC power necessary to energize the electronic circuitry of each of the multi-taps. It is often necessary to open one or more of the multi-taps connected in cascade, in order to change a tap plate for changing the attenuation or signal levels of the signals tapped off for connection to customers, in order to maintain the customers' signal level at an appropriate level of power (an appropriate dB level).

With known multi-taps of the prior art, whenever tap plates must be removed for substituting a new tap plate to obtain higher or lower attenuation, or to repair a particular multi-tap, the main RF signal and associated AC power for the multi-taps down line of the multi-tap being serviced are interrupted or cut off from the down line multi-taps. Accordingly, all customers inclusive of the customers associated with the multi-tap being serviced, and those down line, have their television signal connections interrupted until the servicing of the multi-tap under repair or conversion is completed. Many attempts have been made to overcome this difficulty.

In order to prevent this interruption in the flow of RF and AC to downstream users in the prior art, a jumper tool typically provided by a shunt coaxial cable is coupled between an unused input port and an unused output port of the multi-tap. Whereas this works well when the tap plate just described is removed, the shunt coaxial cable ceases to function as a transmission line when the tap plate is installed and acts instead like an impedance in shunt with the circuit because of a double termination. This double termination prevents a 75 ohm impedance match at the associated junctions. This impedance mismatch causes standing waves with numerous transmission nulls such that a true 75 ohm transmission line does not exist. The effect is to cause significant variation in the frequency response within the band of channels flowing along the transmission line, both for the multi-tap to which it is connected and to downstream users.

SUMMARY OF THE INVENTION

The present invention is designed to overcome the problems in the prior art. Since the characteristic or equivalent circuit of most 75 ohm connectors is dominated by a shunt capacitance this capacitance along with the capacitance of the shunt coaxial cable (typically 15–20 PF/FT) will significantly load down the multi-tap frequency response. By utilizing a specially designed low capacitance connector to insert a low-pass filter (LPF) with a high cutoff frequency above the operating frequency range. The shunt capacitance of the LPF can be made quite small, so that it will have minimal effect on the frequency response of the multi-tap.

In accordance with this invention, a tool is provided for easily connecting and disconnecting a low-pass filter between an unused input port and an unused output port of a multi-tap. The input and output impedances of the tool are the same as the characteristic impedance of the coaxial line with which the multi-tap is used so that it causes no reflections, but the values of its series inductance and shunt capacitance are much less smaller than those of the coaxial cable. Therefor, this shunt circuit provided by the low-pass filter will have minimal effect on the frequency response of the multi-tap.

In a preferred embodiment of the invention, the low-pass filter is comprised of a conductor spaced from a ground plane and capacitive means connected between the center of the conductor and a ground plane so as to form a "T" low-pass filter. Alternatively, the low-pass filter can be comprised of a conductor spaced from a ground plane and capacitive means connected between the ends of the conductor and the ground plane so as to form a $\pi$ low-pass filter.

In either embodiment, each end of the conductor is connected via a compression spring to a prong retained within a housing of insulating material that is insertable into an unused port in such manner that the prong is maintained in contact with the clamping screw within the port by action of the spring. In order to retain the tool in this operating position, spring fingers are mounted about the housing that provided resilient force against the inner walls of the port. Preferably, the spring fingers are made of metal and serve the additional function of connecting the ground plane of the filter to the grounded body of the multi-tap, but they could be made of non-conducting material if the ground plane is connected to the multi-tap in some other way. The fact that there are fingers reduces the capacitance between them and the prong if they are made of metal.

An advantageous feature of this invention is the provision of a light such as a light emitting diode (LED) that is turned on when the shunt tool is properly coupled to a multi-tap.

BRIEF DESCRIPTION OF THE DRAWINGS

Various embodiments of the present invention are described in detail below with reference to the drawings in which like items are identified by the same reference designation, wherein.

DETAILED DESCRIPTION OF THE INVENTION

Figure 1:
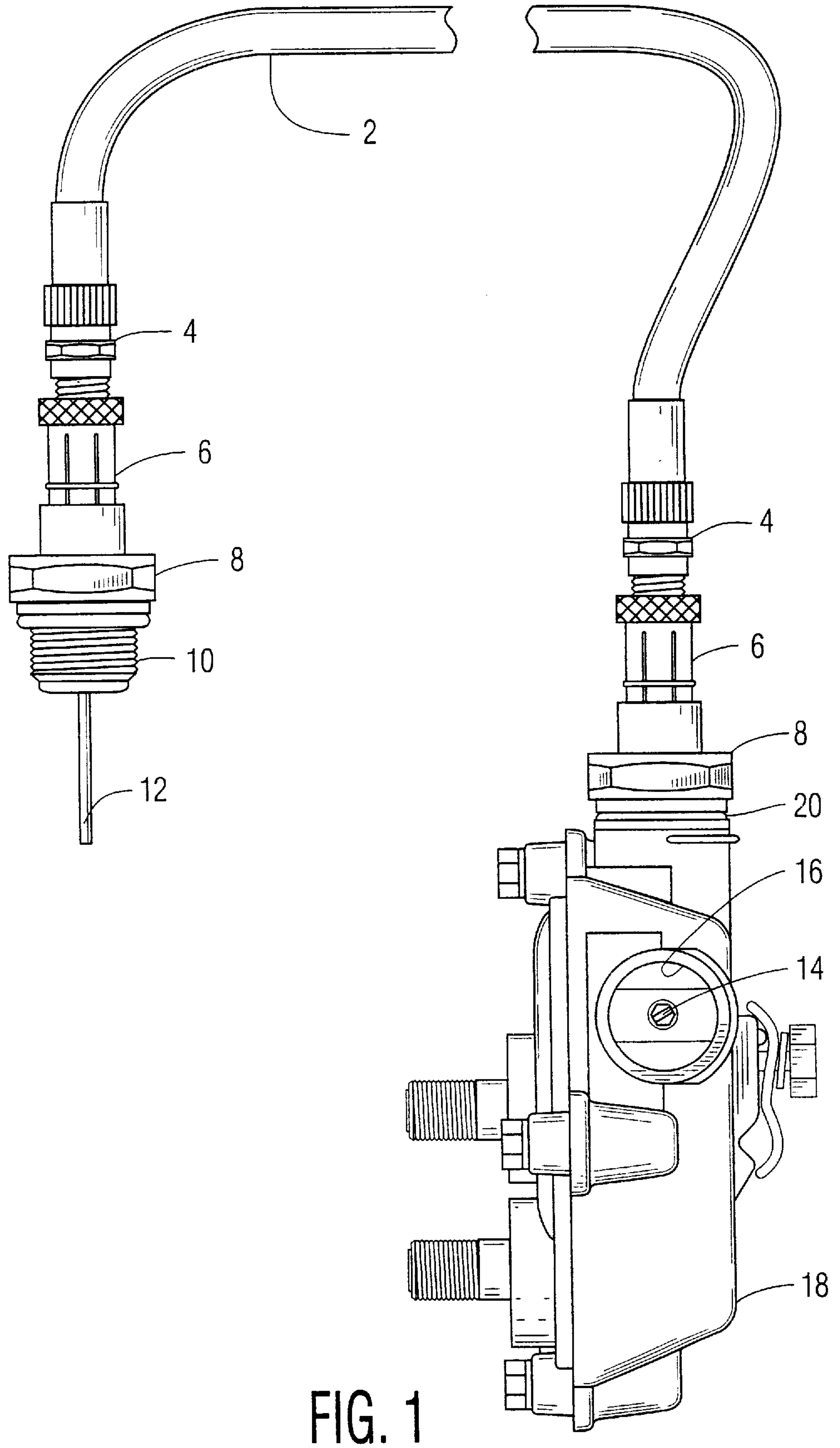
FIG. 1 PRIOR ART
FIG. 1 illustrates the use of a coax cable of the prior art to shunt signals between an input and an output of a multi-tap.

FIG. 1 shows a prior art shunt for a multi-tap using a standard coaxial cable 2. Standard 75 ohm male connectors 4 connected to the ends of the cable 2 are screwed into F-female to F-male push-on adapters 6, and special F2KS adapters 8 are slid into the adapters 6. One of the adapters 8 is shown uncoupled so as to reveal a thread 10 for screwing into a port of a multi-tap and a central pin 12 extending beyond the thread 10. The pin 12 is for connecting the central conductor, not shown, of the cable 2 to a clamping screw, such as indicated at 14 in a port 16 of a multi-tap 18. The other end of the shunt 2 is shown coupled to a port 20 of the multi-tap.

Figure 1A:
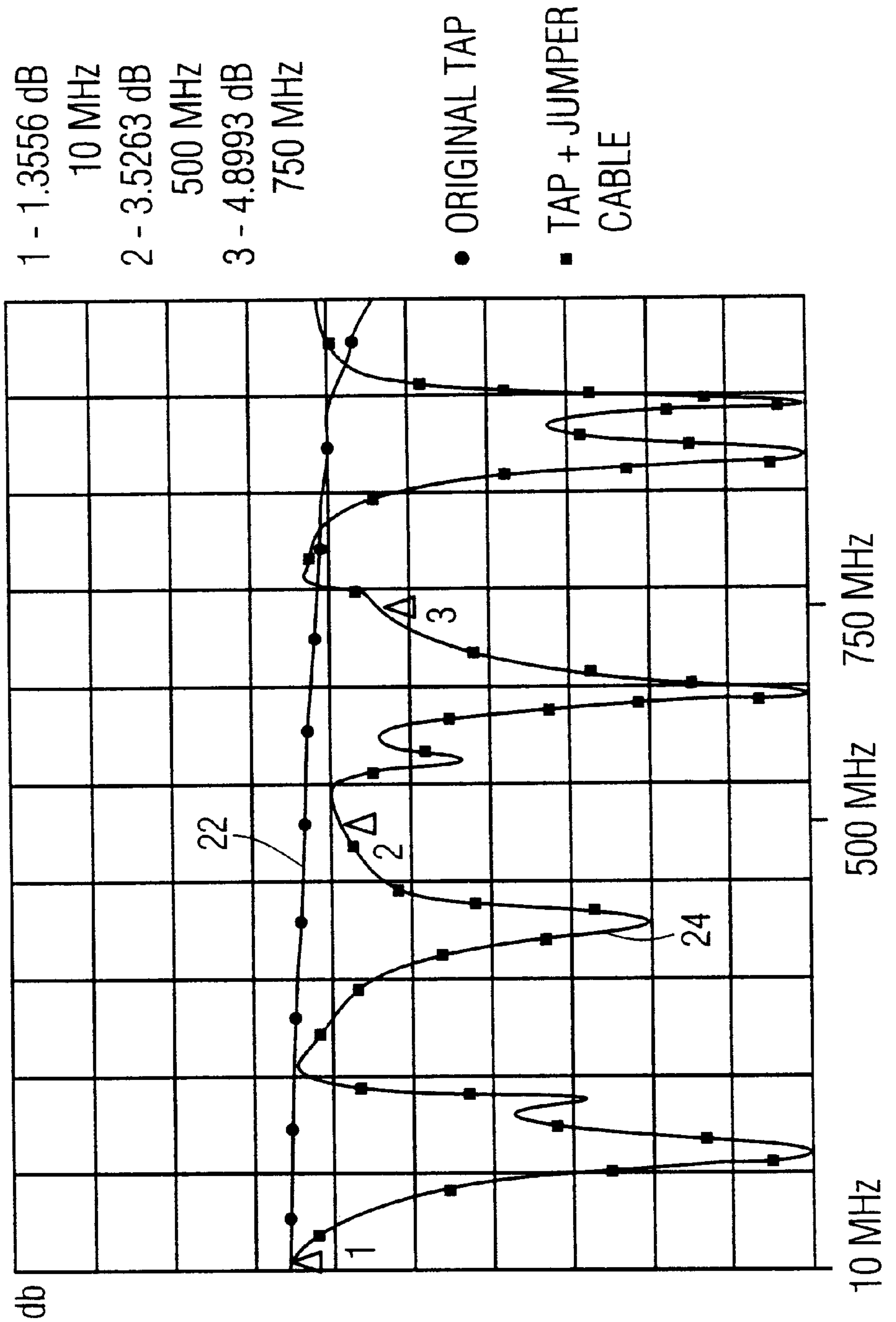
FIG. 1A PRIOR ART
FIG. 1A illustrates the frequency response of the prior art structure of FIG. 1.

FIG. 1A, in the graph in which a curve 22 indicates the frequency response between the input and output of a multi-tap when the coaxial cable shunt 2 of FIG. 1 is not connected, and a curve 24 indicates the frequency response between the input and output of the same multi-tap when the circuit of the multi-tap and the shunt cable 2 are both connected between the input and output of the multi-tap. It can be seen that there is considerable variation between the responses due to the shunt cable acting as a resonant line and introducing multiples of the resonant frequency within the pass-band. Most importantly, for a preferred embodiment this configuration provides a very low distribution capacitance in connecting to the unused input and output ports of the multi-tap, such as ports 30 and 34, respectively of multi-tap 26 (see FIG. 2), which minimizes the effect upon the frequency response of the multi-tap by the shunt tool 36.

Figure 2:
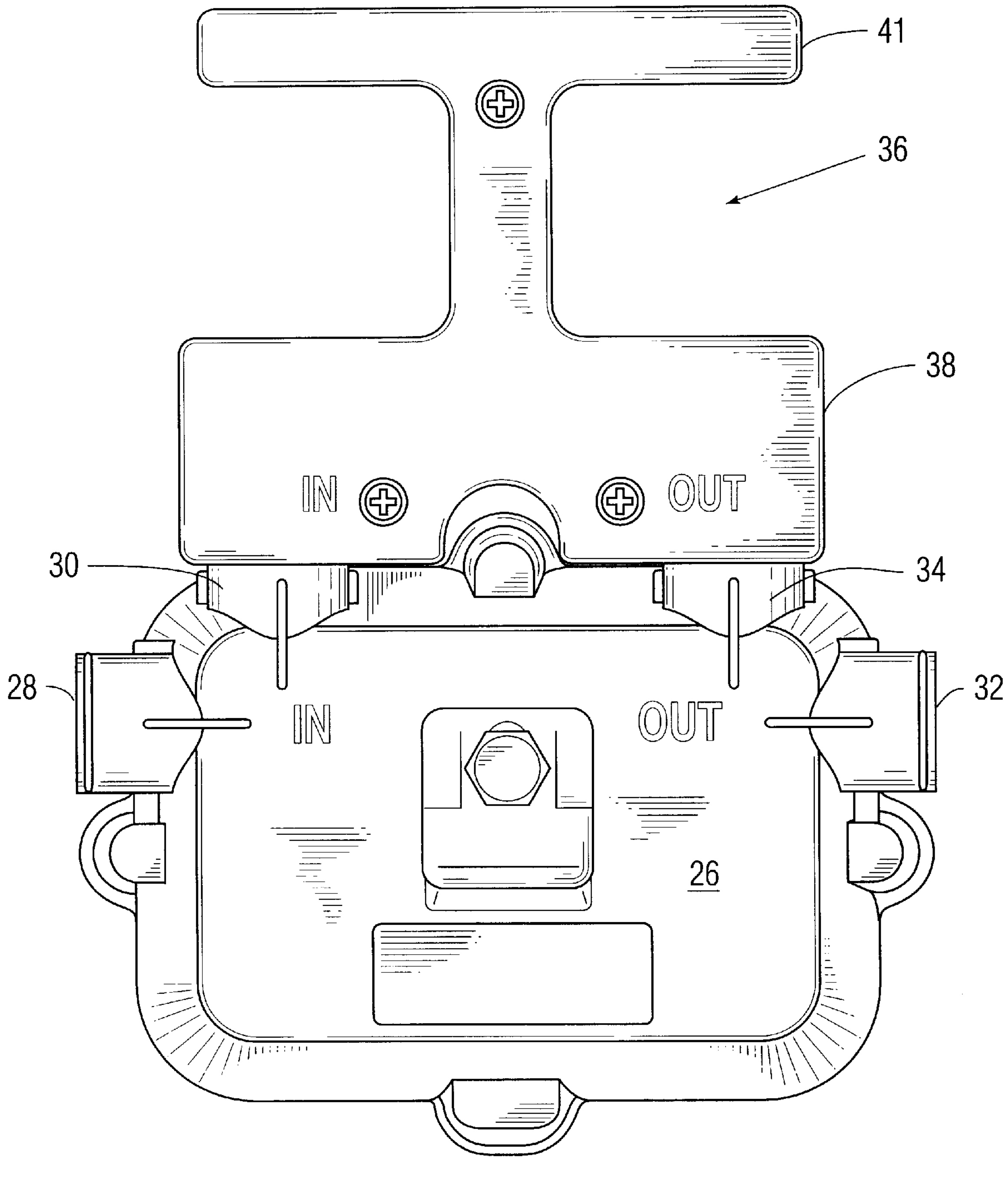
FIG. 2 is a top view of a shunt connector tool of the invention mounted in operative position on a multi-tap.

FIG. 2 is a top view of a multi-tap 26 showing input ports 28 and 30 at a right angle with respect to each other and output ports 32 and 34 that are also at a right angle with respect to each other. A multi-tap shunt tool 36 of this invention is shown coupled to the input port 30 and the output port 34. In this view, the multi-tap shunt tool 36 has the form of a capital I. As will be seen, the electrical circuits are mounted within the lower bar 38, of the I, and the upper bar 41 serves as a handle.

Figure 2A:
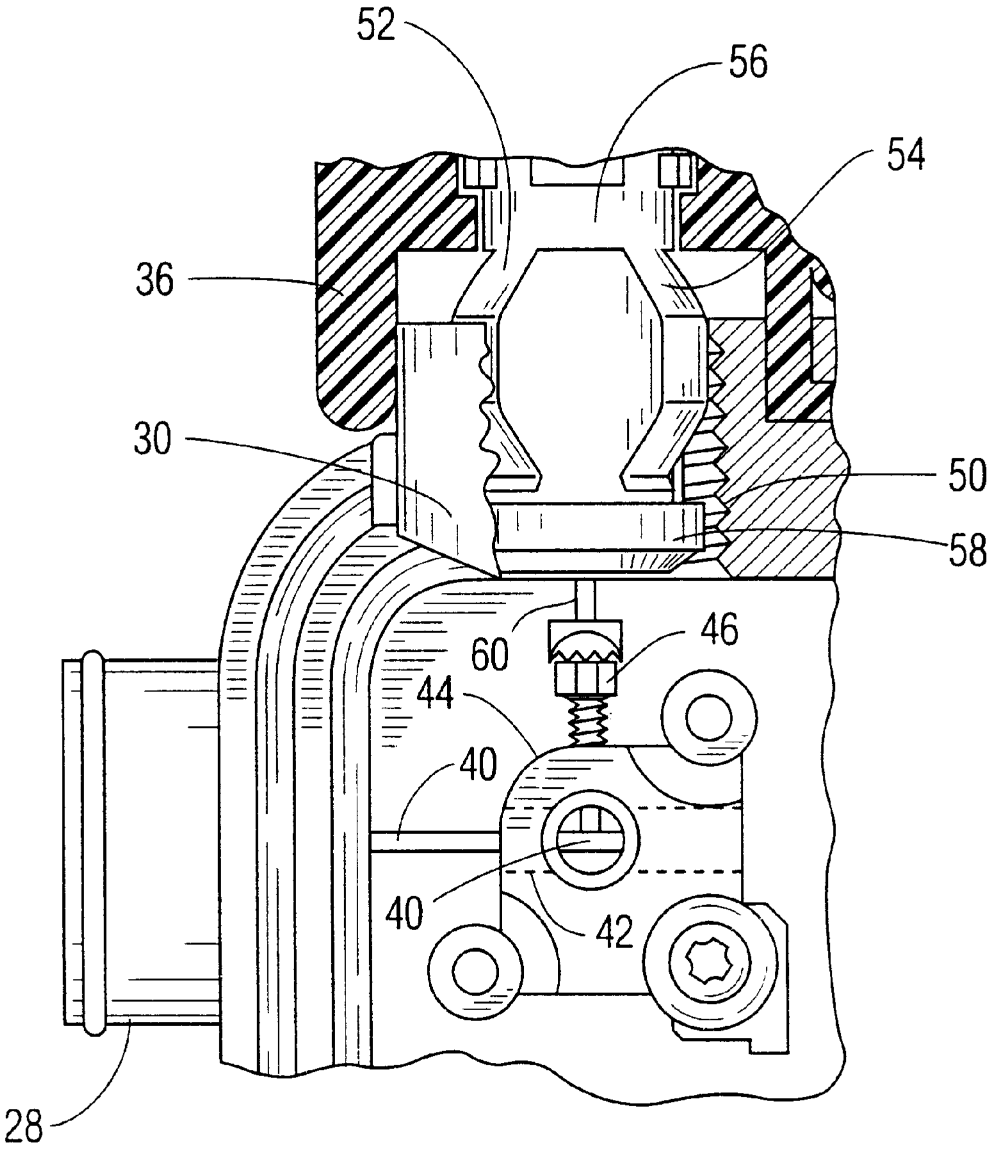
FIG. 2A is a break-a-way view of a portion of FIG. 2; showing how a shunt tool of this invention is mounted onto a multi-tap.

FIG. 2A is a partially broken away view of the input port 30 of FIG. 2 showing how the shunt tool 36 is coupled to it. If the upstream end of a system cable, not shown, is coupled to the input port 28, its central conductor would appear as indicated at 40 and would extend into a passageway 42 shown in dashed lines in a switch 44. A screw 46 that is at a right angle with the passageway 42 is shown as bearing against the conductor 40.

Because of the break-a-way view, the inside of the input port 30 is seen to have a thread 50, as do all ports, and the shunt tool 36 is held in position by spring fingers 52 and 54 bearing against the thread 50. The spring fingers 52 and 54 extend from a band 56 that is mounted around one end of a plastic body 58, and a conductive prong 60 is forced by a spring, not shown, into contact with the screw 46.

Figure 3:
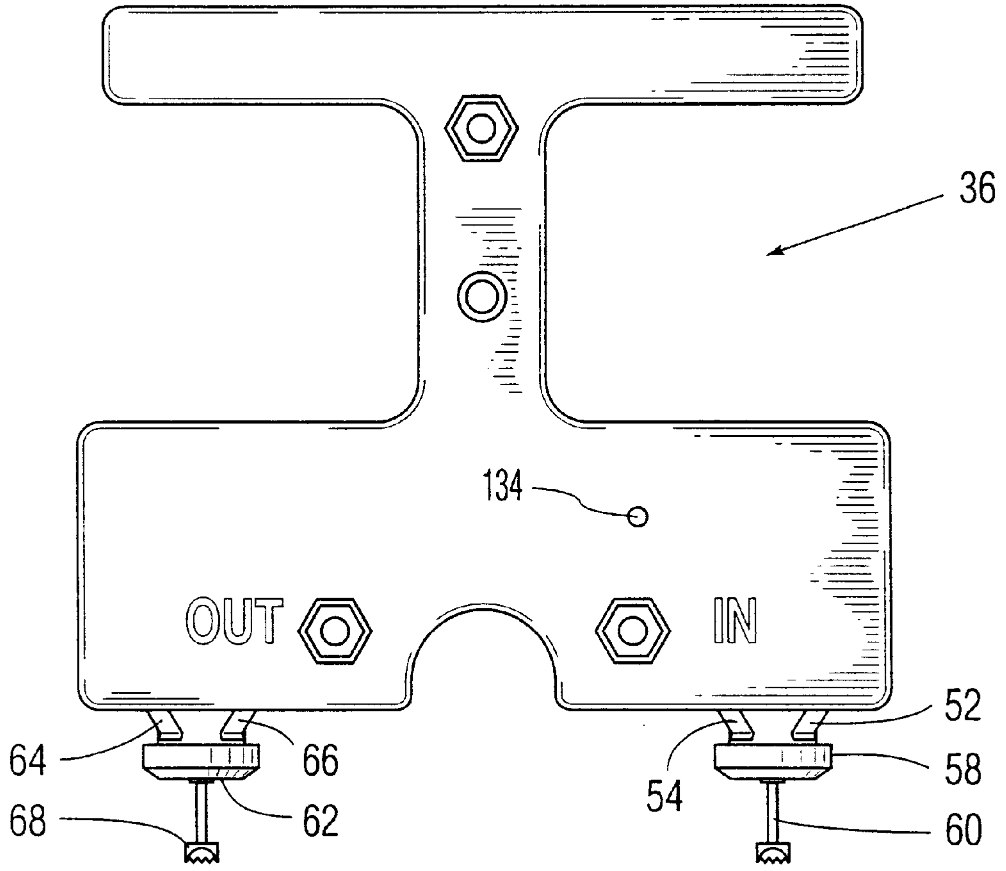
FIG. 3 is a top view of a shunt connector tool of the invention.

FIG. 3 shows the other side of the shunt tool 36 from that seen in FIG. 2. It is not mounted to a multi-tap, so as to show the prong 60, body 58, and spring fingers 52 and 54 for an input port 30 illustrated in FIG. 2A. Also shown are a body 62, spring fingers 64 and 66 and a prong 68 for engagement with an output port such as 34 of FIG. 2. The bodies 58 and 62 are made of insulating material; the prongs 60 and 68 are respectively within them and the fingers 52, 54, 64, and 66 are outside their respective housings.

Figure 4:
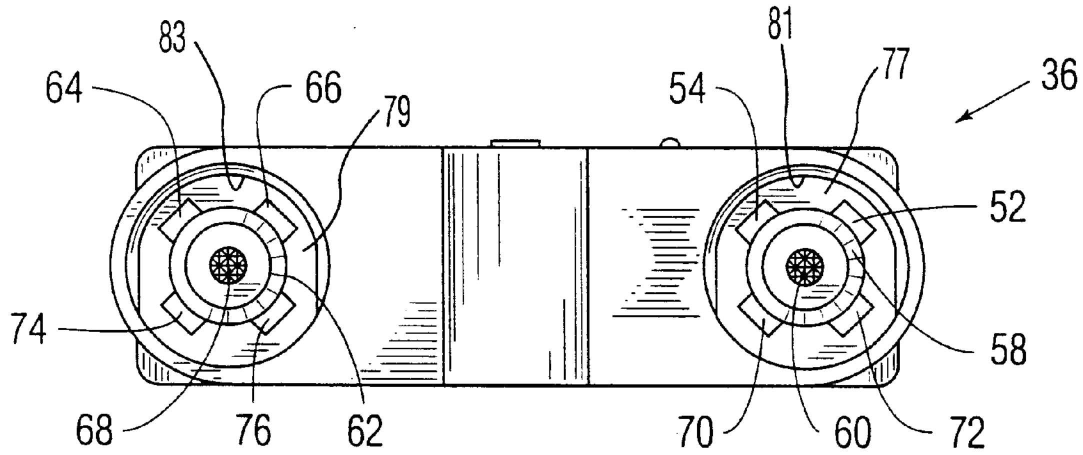
FIG. 4 is a view looking at the ends of the prongs in FIG. 3.

FIG. 4 is an end view of the shunt tool 36 of FIG. 3 showing the plastic body members 58 and 62 and the prongs 60 and 68 within them. In this view, all four spring fingers that are mounted about the body members 58 and 62 can be seen. Thus spring fingers 70 and 72 about the body member 58 and spring fingers 74 and 76 about the body member 62 are now visible. When the shunt tool 36 is attached to the ports of a multi-tap, the walls of the ports slide into annular spaces 77 and 79 that are respectively between the spring fingers 52, 54, 70, and 72 and a wall 81 and the spring fingers 64, 66, 74, and 76 and a wall 83.

Figure 5:
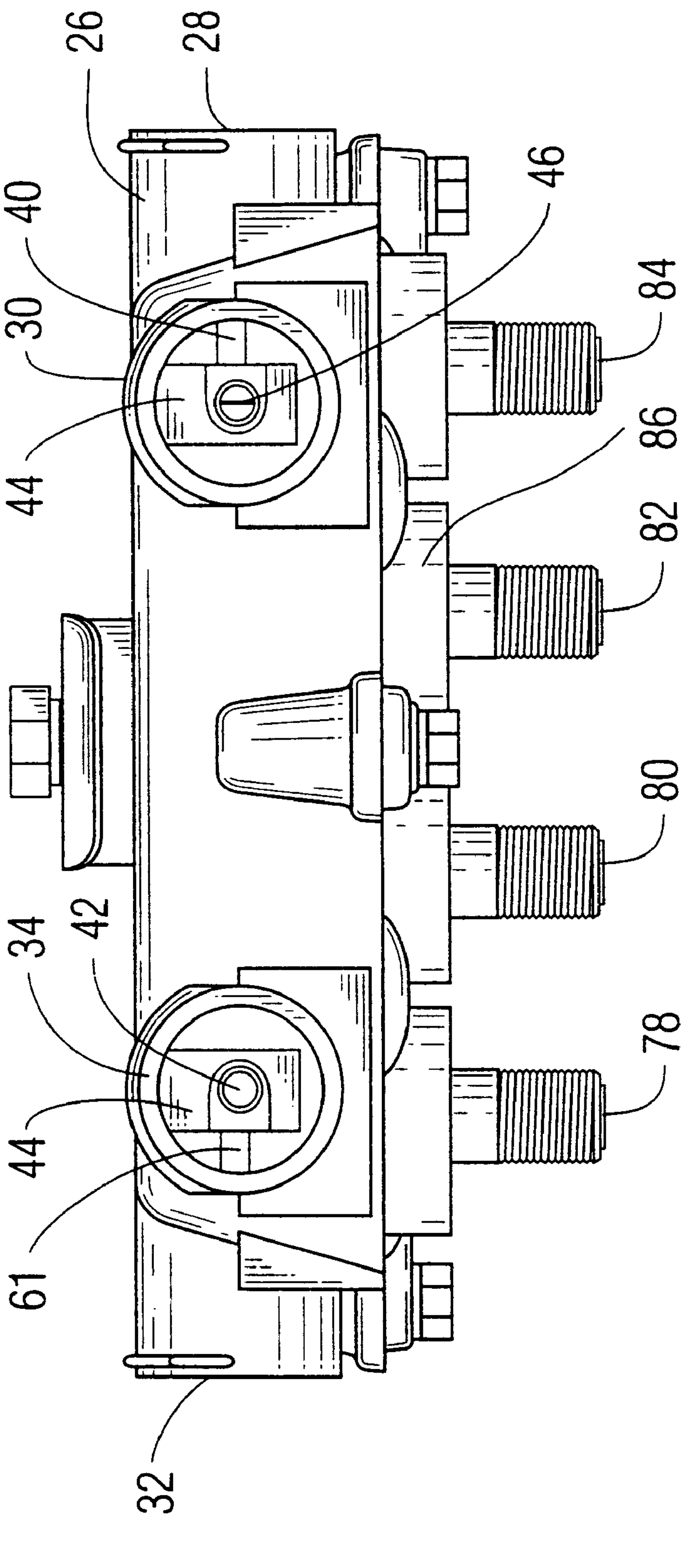
FIG. 5 is a view looking into the ports of a multi-tap.

FIG. 5 is a view looking into ports 30 and 34 of the multi-tap 26 to which a shunt tool 36 is shown as being coupled in FIG. 2. The other port 34 contains the same structure in which like parts have the same reference designation, but the related central conductor is designated as 61. Coaxial coupling 78, 80, 82, and 84 for user cables extend from lid 86 of the multi-tap 26.

Figure 6:
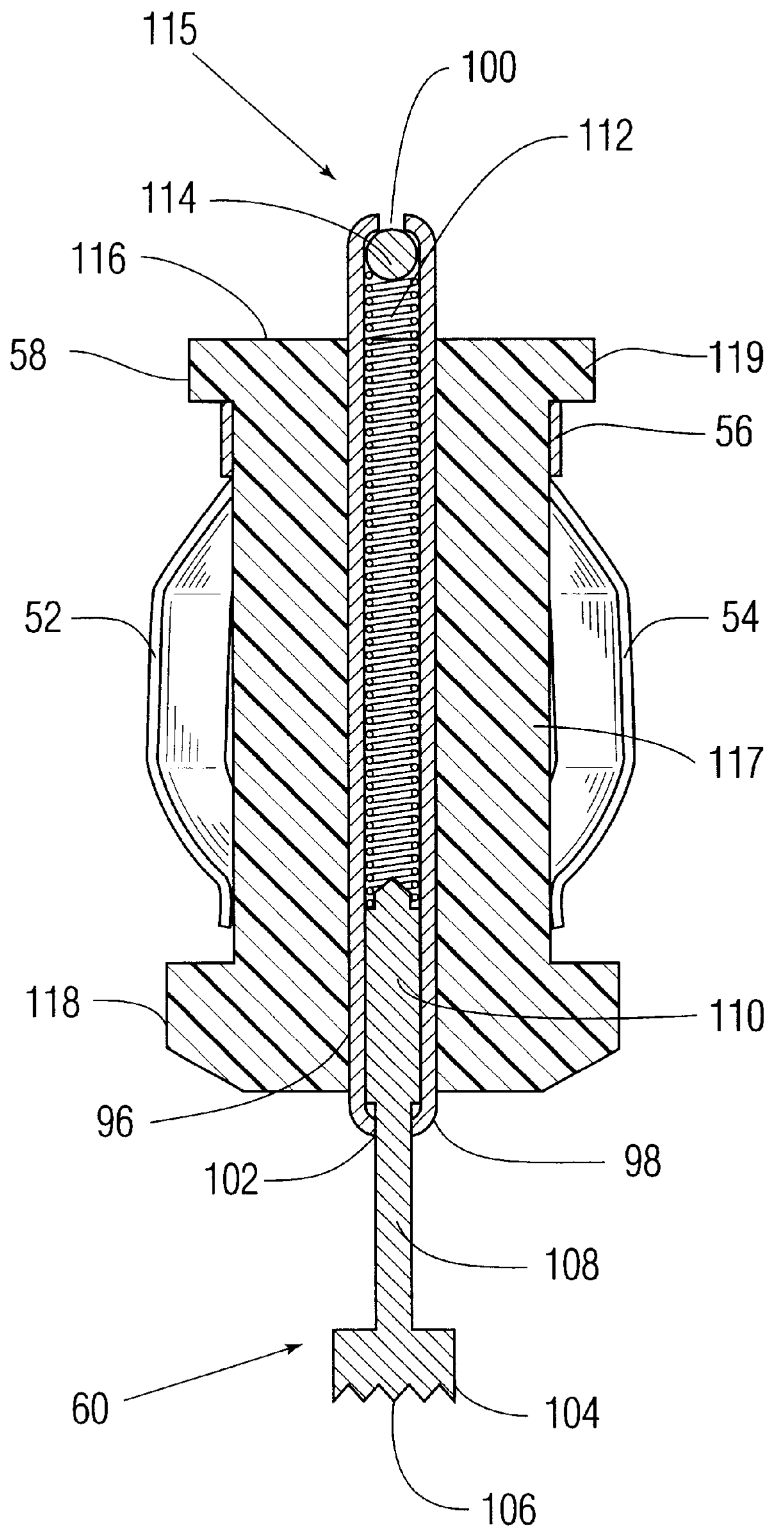
FIG. 6 is a perspective view of the assembly of a prong and associated spring fingers.
Figure 7:
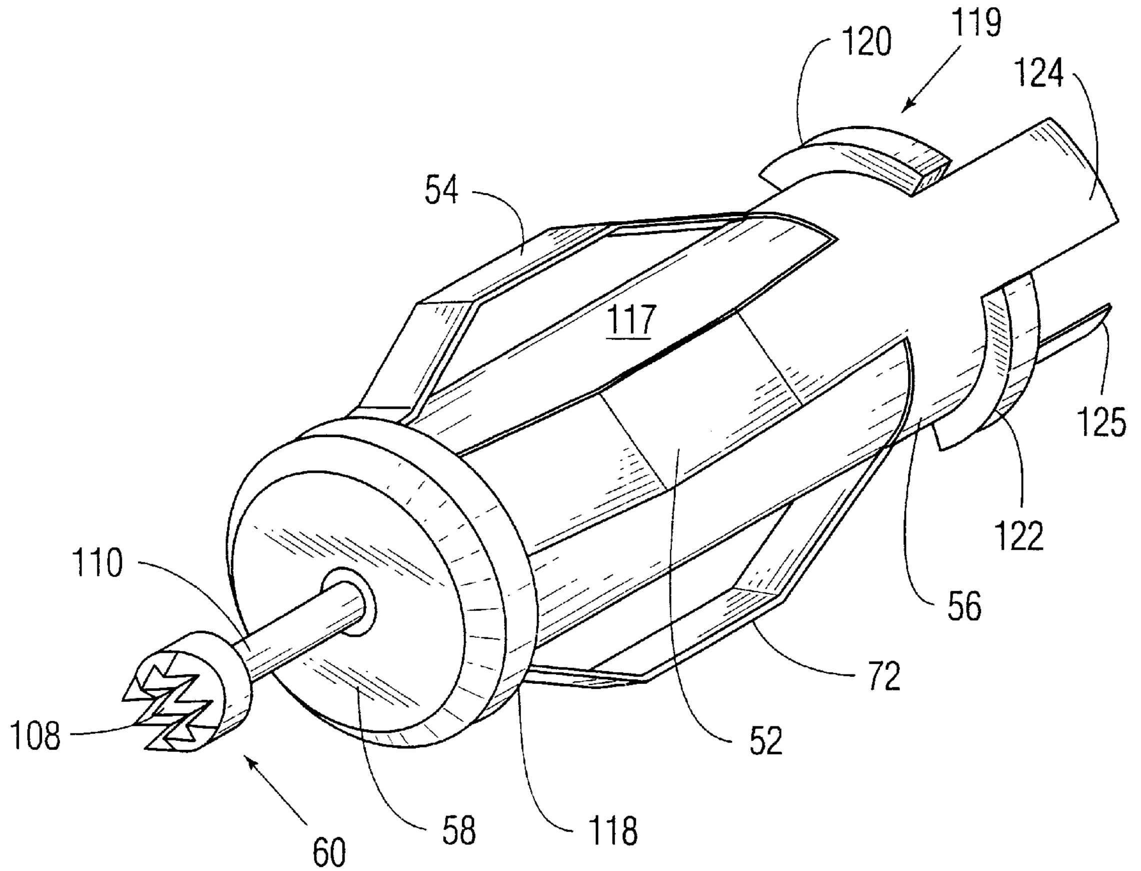
FIG. 7 shows the assembly of a spring mounted prong and spring fingers.

Attention is invited to FIGS. 6 and 7 for a more detailed description of the assembly associated with the prong 60, but it will be understood that the assembly associated with the prong 68 is the same. As viewed in the axial cross-section shown in FIG. 6, the insulating body 58 has a central opening 96 therein containing a tubular member 98 that has openings 100 and 102 at its ends of the smaller diameter than the tubular member 98. The prong 60 has a head 104 that is serrated as indicated at 106 so as to provide good electrical contact with the clamping screw 46, FIG. 2A, and a neck 108 having a sliding fit within the opening 102. The portion 110 of the prong 60 that is in the tubular member 98 has a slide fit therewith. In order to provide a resilient force on the prong 60 when it is forced against the screw 46, a compression spring 112 is mounted in the tubular member 98 between the portion 110 of the prong 60 and a ball 114 that is of larger diameter than the opening 100. An end 115 of the tubular member 98 extends beyond an end surface 116 of the plastic body member 58. In FIG. 6, only the spring fingers are 52 and 54 are visible. At one end the fingers 52 and 54, and the other fingers 70 and 72, not shown here but visible in FIG. 4, are joined to the band 56. All the fingers bow outwardly from a central portion 117 of the body member 58 as illustrated by the fingers 52 and 54. When inserted in a port, the fingers 52, 54, 70, and 72 are compressed and the ends opposite the band 56 slide toward one enlarged end 118 of the body member 58. The other end 119 of the body member 58 is also enlarged so as to prevent the band 56 from sliding off the member 58.

In the three dimensional view of FIG. 7, only three spring fingers 52, 54, and 72 are visible. They extend outwardly from the band 56 that extends around the central portion 117 of the body member 58. The enlarged end 119 of the plastic housing 58 is circumferentially divided into four segments only two of which, 120 and 122, are visible. Strips from the band 56 extend through spaces between the segments, but only a strip 124 that extends between the segments 120 and 122 and a strip 125 that extends between the segment 122 and the next segment, not shown, are visible in this view.

Figure 8B:
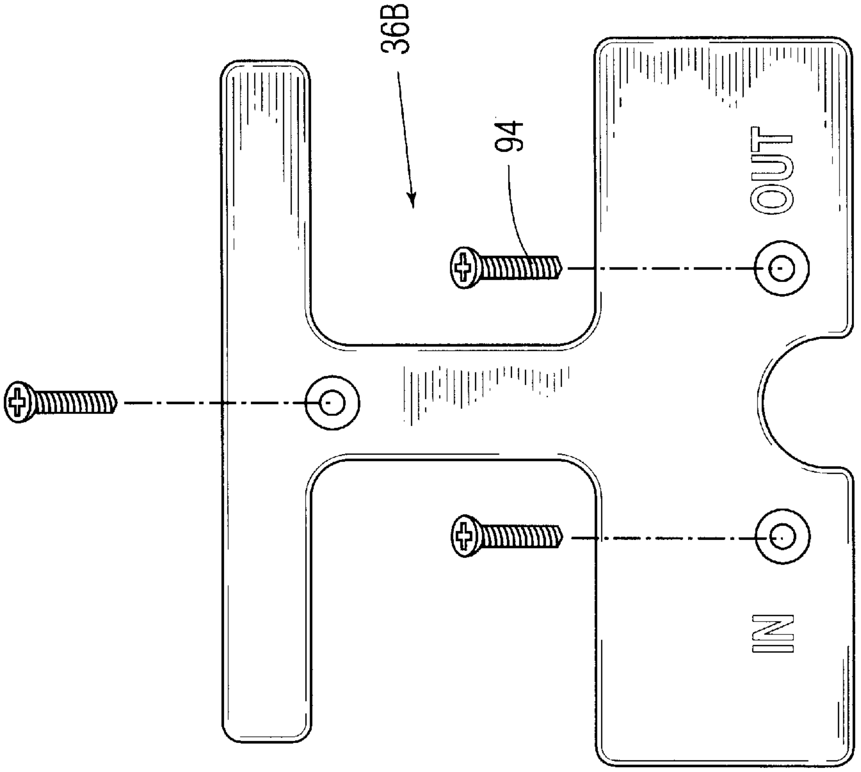
FIG. 8B is a top view of a shunt tool of the invention.
Figure 8A:
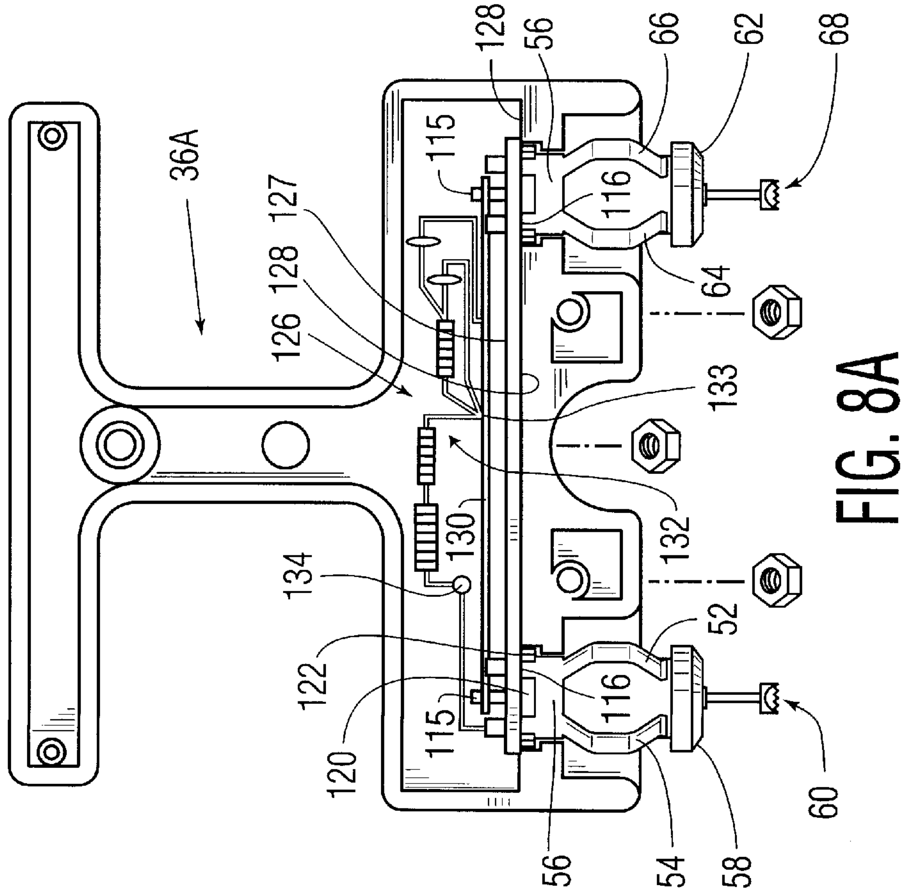
FIG. 8A is a view of a shunt connector tool with its bottom removed so that the internal circuit components are visible.

Reference is now made to FIG. 8A for a description of a preferred embodiment of the low-pass filter 126 of this invention that is contained in one half 36A of the body of the tool. A FR4 circuit board 127 has a conductive ground plane 128 thereon. An assembly such as shown in FIGS. 6 and 7 is mounted at ends of the circuit broad 126. The ends 115 of the tubular members 98 in FIG. 6 are passed through the circuit board 126 until the surfaces 116 of the insulating bodies 58 and 62 are in contact with the ground plane 128. The four strips extending from the band 56, such as the strips 124 and 125 shown in FIG. 7, are bent radially outward and soldered to the ground plane 128.

The low-pass filter 126 is comprised of a wire 130 that is spaced from the board 126 and connected between the ends 115 of the tubular members 98 in FIG. 6 associated with the prongs 60 and 68. As shown, circuit components as indicated at 132 are connected between the center 133 of the wire 130 and the ground plane 128. A LED 134 that is shown in FIG. 8A is visible to the user as shown in FIG. 3. FIG. 8B shows a half 36B of the shunt tool that is attached by bolts 94 and nuts, not designated by number, to the half 36A.

Figure 9A:
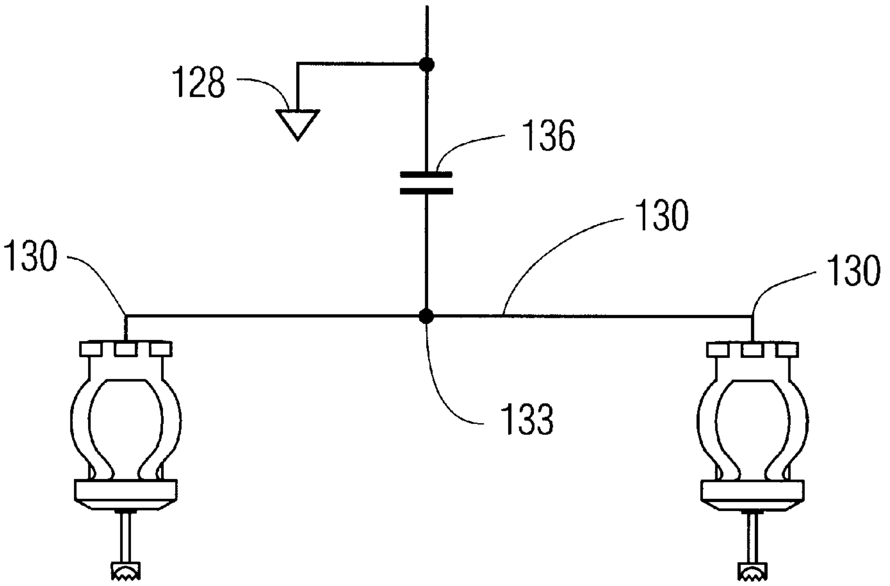
FIG. 9A is a simplified view of an embodiment of the invention employing a "T" low-pass filter.
Figure 9B:
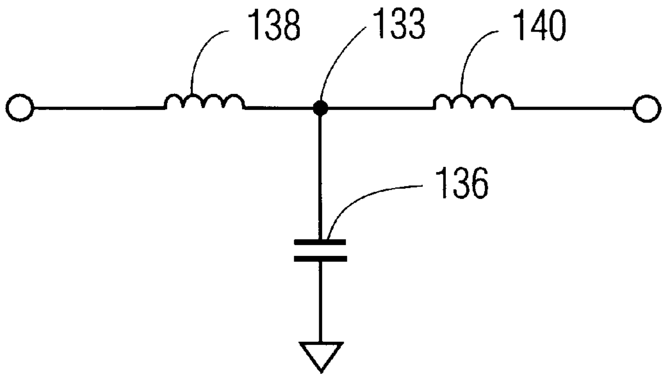
FIG. 9B is an equivalent circuit of FIG. 9A.

In the simplest embodiment of the invention illustrated in FIG. 9A, a capacitor 136 is connected between the center 133 of the wire 130 and the ground plane 128. FIG. 9B is the equivalent circuit for the structure shown in FIG. 9A in which inductances 138 and 140 represent the inductances of the wire 130 on opposite sides of its center 133.

Figure 9C:
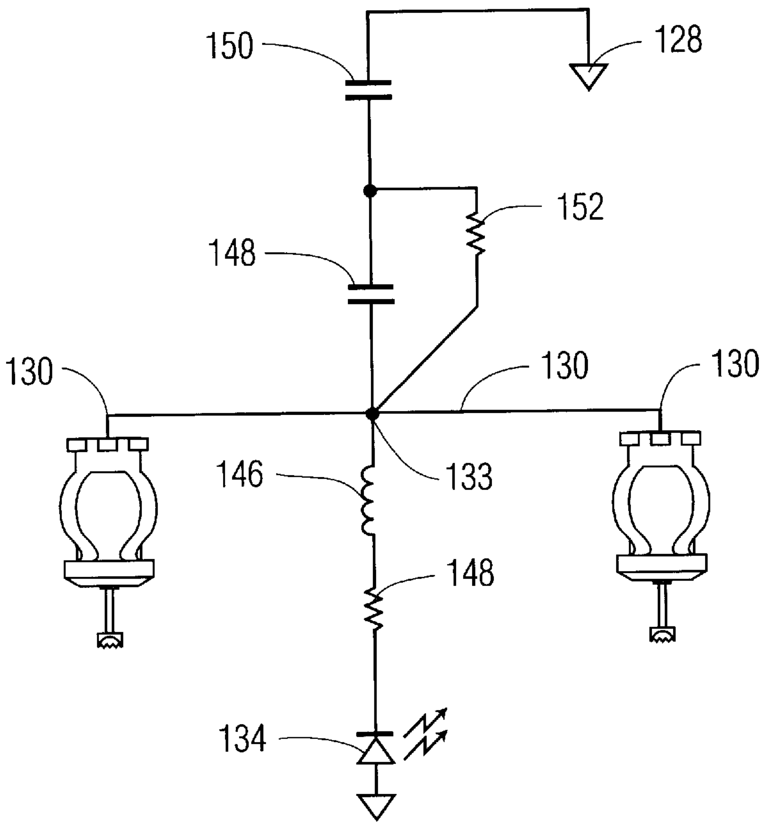
FIG. 9C is a simplified view of a preferred embodiment of the invention that employs a "T" low-pass filter and has an indicator light.

FIG. 9C illustrates the circuit components used if the light is to be a LED 134 to indicate when the shunt tool is operatively connected. An inductor 146 that blocks the RF and a current limiting resistor 148 are connected in series with the LED 134 between the center 133 of the wire 130 and ground. Instead of a single capacitor to ground as in FIG. 9A, capacitors 148 and 150 are connected in series between the center 133 of the wire 130 and the ground plane 128, and a resistor 152 is connected in parallel with the capacitor 148. The capacitor 148 and resistor 152 compensate for the presence of the circuit for the LED 134 to maintain the frequency response.

Figure 9D:
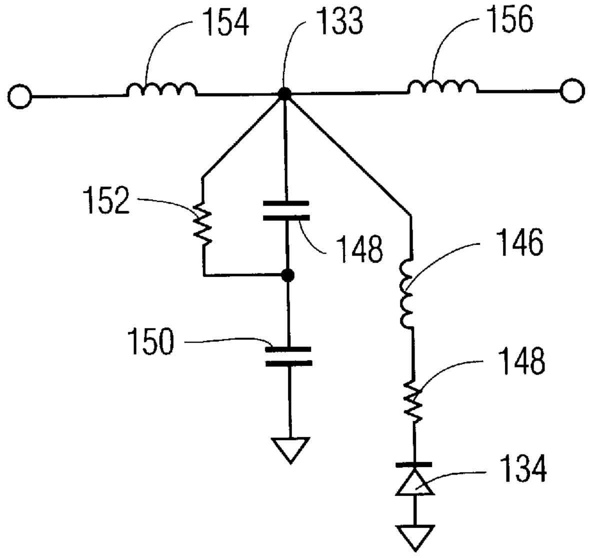
FIG. 9D is an equivalent circuit of FIG. 9C.

FIG. 9D is an equivalent circuit for FIG. 9C in which inductors 154 and 156 represent the inductance of the wire 130 on opposite sides of its center 133.

The size of the tool 36 is determined by the size of the multi-tap it is to be used with. Similarly, the value of components such as capacitor 136, and other components, are determined by the particular application for the tool 36, such as the distance between the two ports on the multi-tap and the highest cutoff frequency required.

Figure 10:
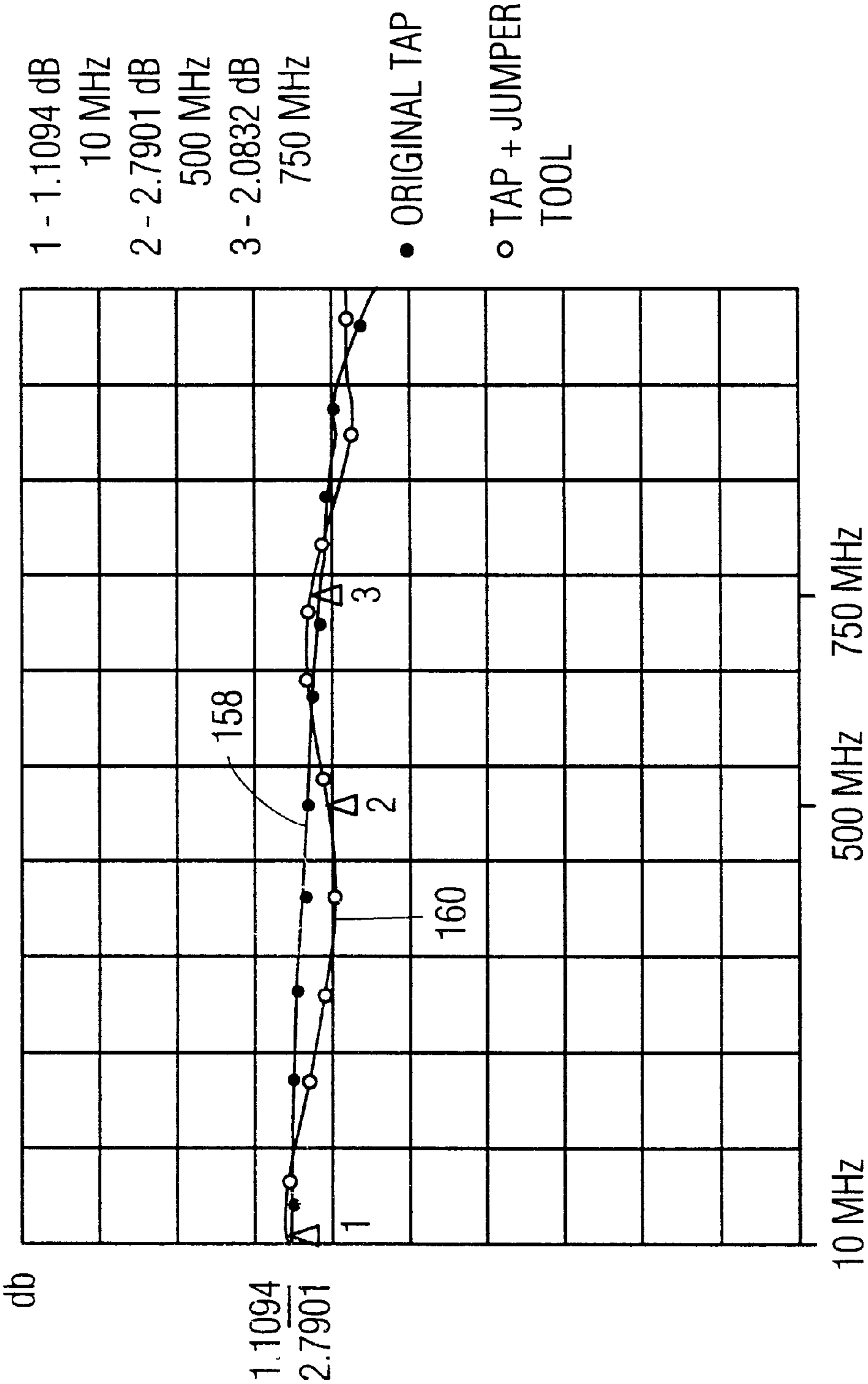
FIG. 10 illustrates the frequency response of a shunt tool of this invention.

FIG. 10 illustrates the frequency response of the shunt tool of FIGS. 9A, 9B, 9C, and 9D in which the frequency response of a multi-tap without a shunt is illustrated by a curve 158 and the frequency response of a multi-tap with the shunt of the invention connected is illustrated by a curve 160. Comparison of these results with the results obtained by the shunt coaxial cable of the prior art as illustrated in FIG. 1A shows that the invented circuit is far superior.

Figure 11A:
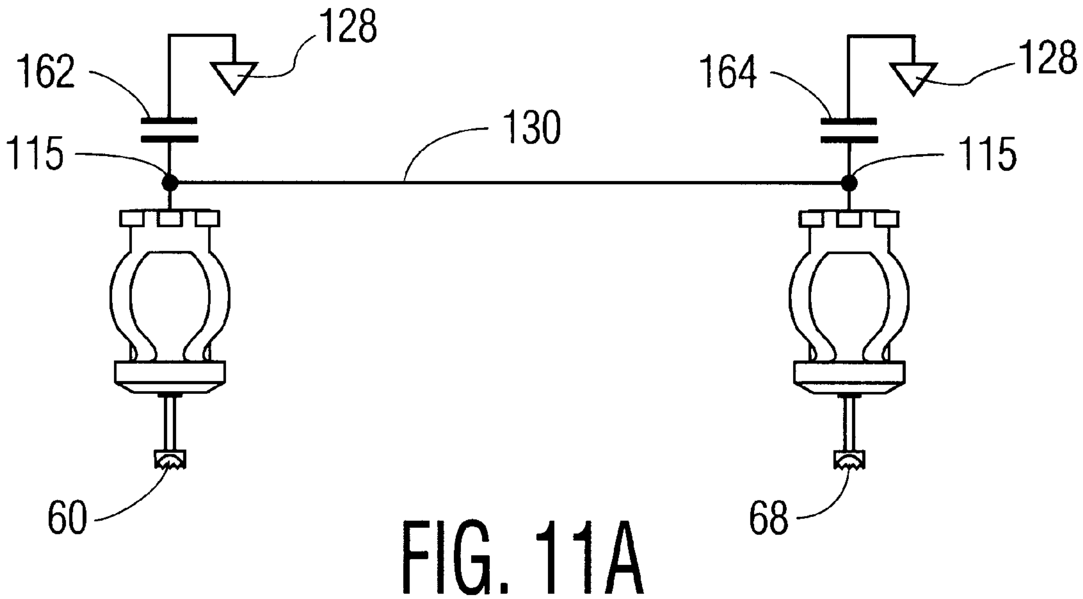
FIG. 11A is a simplified view of an embodiment of the invention employing a π low-pass filter.
Figure 11B:
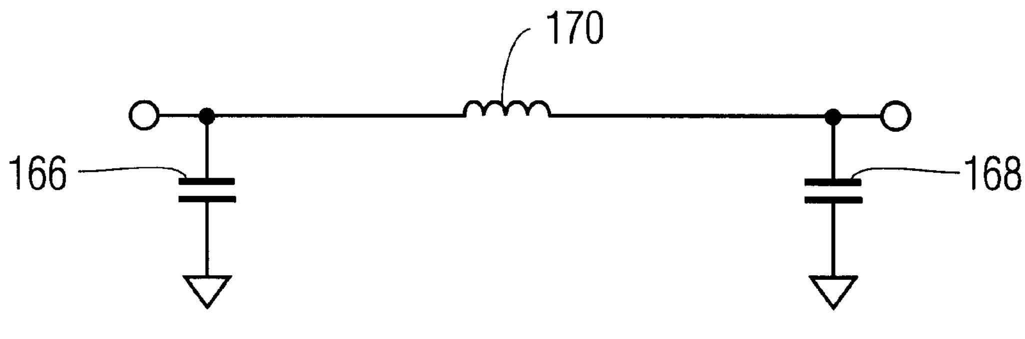
FIG. 11B is an equivalent circuit of FIG. 11A.

Instead of using a "T" type low-pass filter such as 126 in FIG. 8A, a $\pi$ type low-pass filter as illustrated in FIG. 11A may be used. As can best be understood from FIG. 7, there is a small amount of inductance associated with a prong such as the prong 60 and a tubular member such as the tubular member 110 as well as a small amount of inherent capacitance between them and the spring fingers 52, 54, etc.. If this capacitance is sufficient for the band of frequencies involved, no circuit components are needed, and the wire 130 is connected between the ends 115 of tubular members 98 associated with prongs 60 and 68 as described in connection with FIG. 8A. But, if these inherent capacitances are not sufficient, capacitors 162 and 164 are respectively connected between the ends 115 and ground, which is provided by the ground plane 128, not shown in FIG. 11A. In either case, the equivalent circuit is as shown in FIG. 11B wherein a capacitor 166 represents the total capacity between one an end 115 of one prong's tubular member 98 115 and ground, a capacitor 168 represents the total capacity between the other end 115 of the other prong's tubular member 98 and ground, and an inductor 170 represents the inductance of the wire 130.

As has been explained, the spring fingers 52, 54, 70, and 72 associated with the prong 60 and the spring fingers 64, 66, 74, and 76 associated with the prong 68 not only serve to retain the shunt tool of this invention in operating position but they also provide ground connections for the ground plane 128 on the circuit board 126, FIG. 8A. The spring fingers could be made of non-conductive material in which case the ground connection between the ground plane 128 and the wall of a multi-tap may be made in some other way, such as a metal grounding finger from the ground plane 128 that is in contact with the multi-tap when the shunt tool is in operative position.

In order to reduce the inherent capacitance formed between prong 60 and spring fingers 64, 66, 74 and 76, some of them could be made of non-conductive material.

Figure 12:
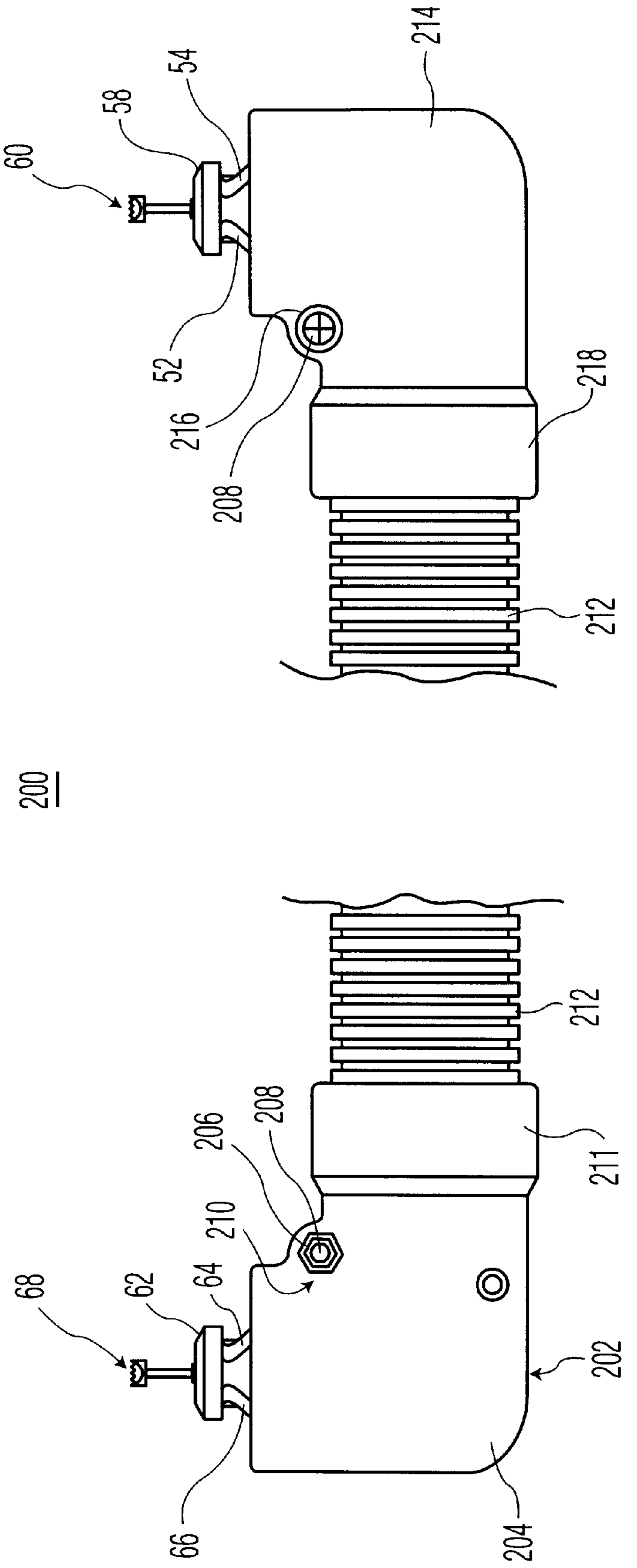
FIG. 12 is a top view of a flexible shunt connector tool of another embodiment of the invention.

In another embodiment of the invention, as shown in FIG. 12, the shunt tool is incorporated into a housing configuration that has a substantially flexible main portion 212, as shown in FIG. 12. The ends of the flexible outer central housing portion 212 are captively held in a collar end portion 211 of connector housing section 204, and a collar end portion 218 of connector housing section 214, respectively. As will be shown below, the connector housing 202 consists of a connector half-section 204 secured to a connector half-section 214, at each end of the flexible housing section 212, with the difference being that the connector sections 204 and 214 are joined at each end in reverse combination to one another for captively retaining an associated end of the flexible outer housing portion 212. A screw 208 is inserted through a hole 216 in a connector half section 214, and pushed through to screw into and be secured to a hex-shaped nut 206 non-rotatively retained within a hex-shaped cavity 210 on the connector half section 204, as shown.

Figure 13:
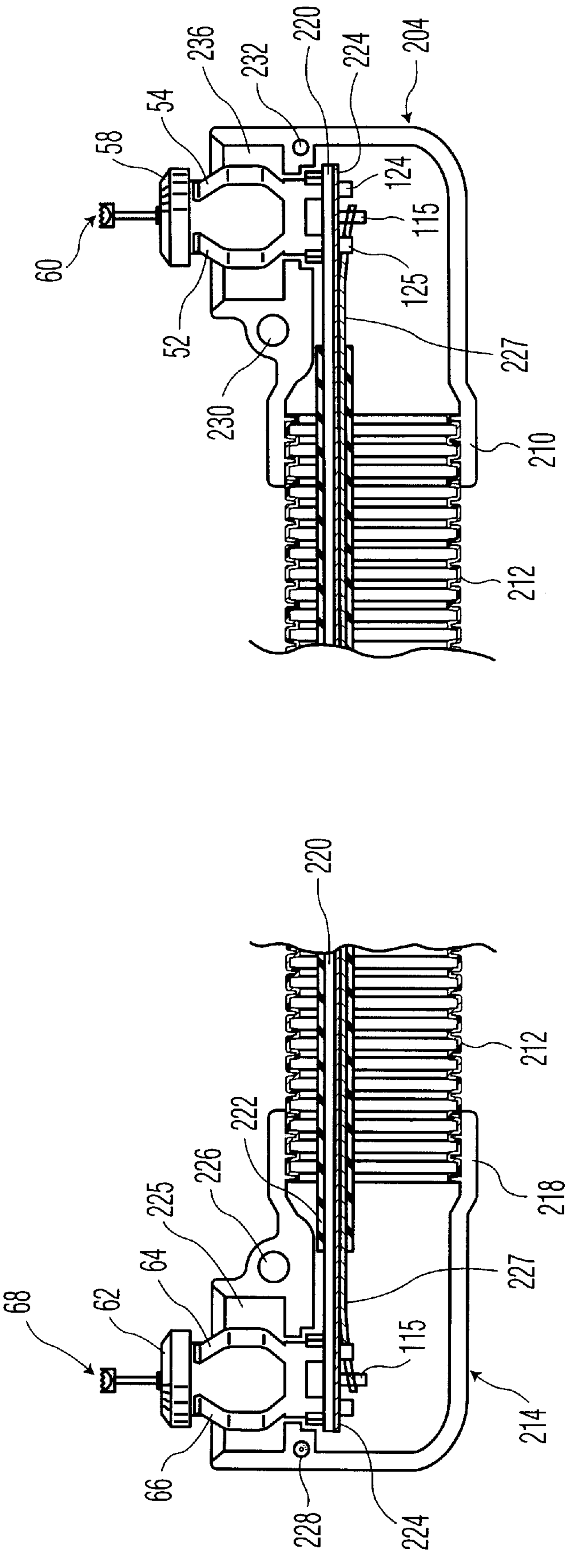
FIG. 13 is a partial breakaway view of the tool of FIG. 12.

In FIG. 13 a partial breakaway and sectional view of the tool 200 of FIG. 12 is shown. The other end of the prong 68, as previously described, is electrically connected to the end 115 of an associated tubular member 98 (see FIG. 6). The end 115 extends from its associated prong 68, in this example, through a hole in one end of a printed circuit board 220, and a hole in a copper layer or ground plane 224 on the other side of the printed circuit board 220, as shown, with the end 115 being soldered to an end of an otherwise enamel coated conductor 227. Similarly, at the other end of the associated flexible housing portion 212, the prong 60 of the connector at that end is electrically connected to the end 115 of an associated tubular member, with the end 115 being soldered to the other end of the conductor 227, as shown. Also, a substantial portion of the printed circuit board 220, with its bonded copper ground plane 224, in this example, and the conductor 227, are covered by shrink-wrap tubing 222, as shown. Note that the printed circuit board 220, its copper ground plane layer 224, and the conductor 227, are flexible over their entire lengths, and along with the flexible body portion 212 permit the tool to be bent into a U-shape with the probe assemblies at either end opposing one another at a distance. In this manner, the prongs 60 and 68 can be inserted into the input and output connector ports at opposite ends of the multi-tap, such as ports 28 and 32 of the multi-tap of FIG. 2, for shunting signals therebetween, as previously described for the first embodiment of the invention. Note that the ends of the spring fingers, such as 52 and 54, of the associated probe, have their interior ends inserted through holes in the printed circuit board 220 and copper ground plane 224, for soldering thereto. Note that in the preferred embodiment, the flexible ribbed central housing portion 212, and the connector sections 204 and 214 consist of plastic material. Also, the connector assemblies at either end of the tool can rotate at least 45° for facilitating insertion of the probes into the end ports of a multi-tap.

Figure 14:
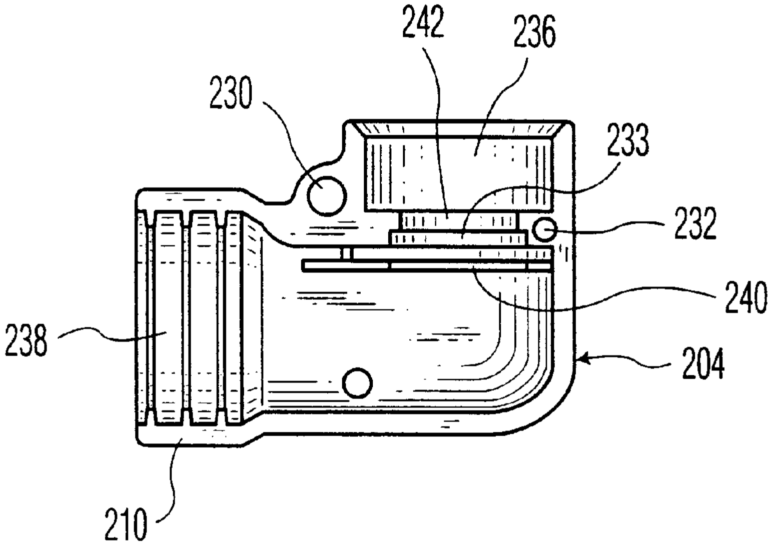
FIG. 14 is an interior view of one-half of an end connector body for the tool of FIG. 12.
Figure 15:
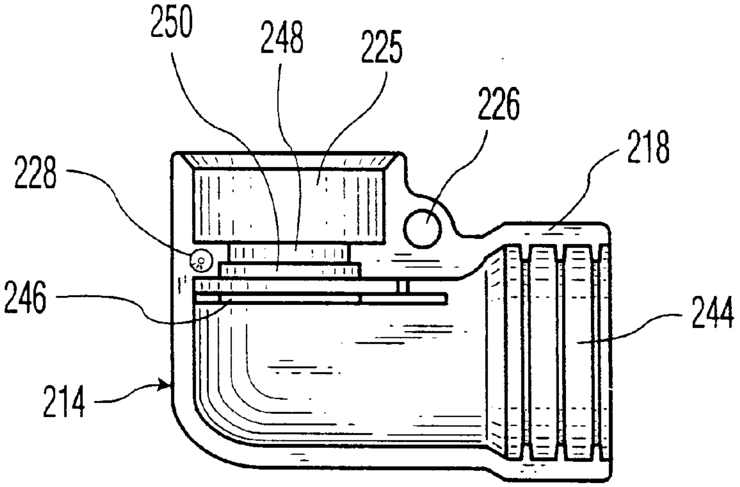
FIG. 15 is an interior view of the mate to the end connector body to that of FIG. 14.

The connector housing 202 at either end of the flexible tool embodiment consists of two half shell connector sections 204 and 214, as shown in FIGS. 14 and 15, respectively, in detail. The connector housing half section 204 includes in its interior portion semi-circular grooves 238 for receiving spaced apart ribs of the flexible housing portion 212, a longitudinal slotway 240 for captively receiving an edge portion of the printed circuit board 220 and its copper ground plane 224. Also included is a semi-circular portion 236 for surrounding a portion of the associated probe, and having an inside diameter that is slightly greater than the outside diameter of the port of the multi-tap to which the associated probe and connector is to be mated. The semi-circular cavity 236 reduces in diameter to a semicircular portion 242, which in turn opens to a slightly expanded semicircular section 233 for securement to a lower portion of the contact spring fingers of the associated probe, as shown in FIG. 13. The hole 230 is for permitting a portion of the screw 208 to pass through. Also, a blind hole 232 is provide for receiving a post 228 of the mating half section connector shown in FIG. 15, for purposes of easy assembly of the two halves together. The mating connector half section shown in FIG. 15 is substantially, with slight variation, a mirror image of that of FIG. 14.

With reference to FIG. 15, the connector half section 214 includes a hole 226 for permitting the screw 208 to pass through, semi circular grooves 244 for receiving a portion of an end of the flexible housing or tubing 212, and a slotway 246 for captively receiving an edge portion of the printed circuit board 220, and its ground plane layer 224. Also included is a semicircular cavity 225 for mating with the semi-circular cavity 236 of the connector section of FIG. 14. The semi-circular cavity 225 reduces to a semi-circular portion 248, which in turn opens to a slightly expanded semi-circular section 250, as shown. Note that the mating connector half section 204 includes a semi-circular portion 233 for mating with the semi-circular portion 250 of connector section 214, for forming a narrow circular cavity. As previously mentioned, each end of the flexible tool embodiment of the invention, includes the two connector half sections 204 and 214 mated together, as partially shown as FIGS. 12 and 13.

Figure 16:
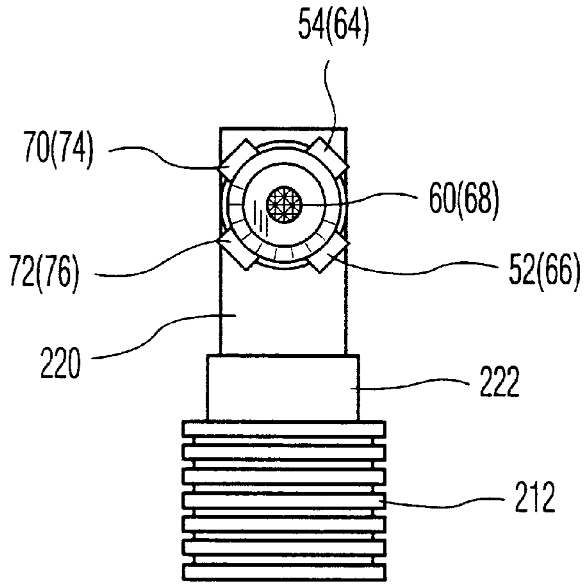
FIG. 16 is a top view looking down upon a prong at one end of the flexible shunt connector tool with the associated end connector body removed.

In FIG. 16, an end view looking down upon a prong 60 or 68 at either end of the flexible shunt connector tool with the associated connector bodies 204 and 214 removed, is shown.

Figure 17:
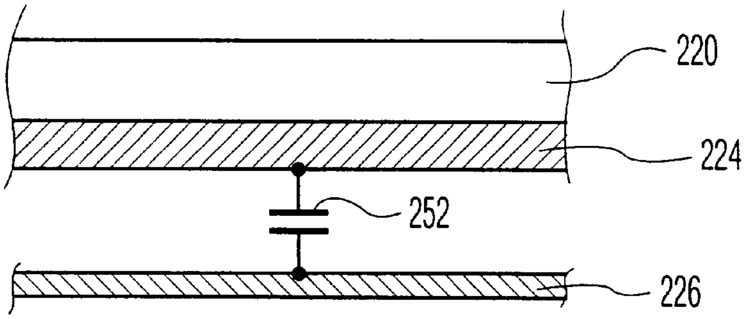
FIG. 17 is a partial cross-sectional view of the middle portion of the flexible shunt tool.

For purposes of insuring that the impedance of the flexible shunt tool embodiment of the present invention is 75 ohms, in this example, it may be necessary to include a capacitor 252 between the conductor 226 and the ground plane 224, preferably near the center of the printed circuit board 220, as shown in FIG. 17. For certain operating frequencies, the equivalent capacitance existing between conductor 226 and ground plan 224 may be sufficient to obtain the required impedance. Note that the nominal capacitance per foot for a typical 75 ohm RG 59 cable is 16.5 pf (picofarads). In this example, the distribution capacitance for the low capacitance connectors of the invention may be less than or equal to the required capacitance value for the low pass filter at the highest operating frequency. The higher the operating frequency the lower the required capacitance or capacitor 252.

Although various embodiments of the invention have been shown and described in detail, they are not meant to limiting. Those of skill in the art may recognize various modifications to those embodiments, which modifications are meant to be covered by the spirit and scope of the appended claims.

What is claimed is:

1. A tool for shunting RF signals and AC power between input and output ports of a multi-tap for cable television systems, comprising:

low capacitance coupling means for selectively connecting a low-pass filter circuit across said input and output ports;

said low-pass filter including predetermined inductance means for conducting the RF signals and AC power between the input and output ports, and shunt capacitance means connected between said inductance means and a ground plane, whereby the input and output impedance of said low-pass filter is equivalent to that of an associated transmission line, and the cut off frequency of said low-pass filter is predetermined to be greater than the frequency range of said multi-tap.

2. The shunting tool of claim 1, wherein the values of said inductance means are predetermined for minimizing the value of said shunt capacitance means.

3. A tool for shunting RF signals and AC power between first and second ports comprising:

a first prong for connection to said first port;

a second prong for connection to said second port;

a ground conductor; and a low-pass filter coupled between said first and second prongs and referenced to said ground conductor;

said low-pass filter having input and output impedances equivalent to the characteristic impedance of an associated transmission line.

4. A tool as set forth in claim 3 wherein flexible members are respectively mounted about each of said first and second prongs for providing reaction forces outwardly from said prongs when compressed.

5. A tool as set forth in claim 4 wherein means are provided for connecting said ground conductor to a multi-tap when said tool is coupled between ports thereof.

6. A tool as set forth in claim 5 wherein at least one of said flexible members is the said means for connecting said ground conductor to a multi-tap.

7. A tool as set forth in claim 3 wherein said low-pass filter is comprised of:

a conductor spaced from said ground conductor; and at least one capacitor connected between said conductor and said ground conductor.

8. A tool as set forth in claim 3 wherein said low-pass filter is comprised of:

a conductor spaced from said ground conductor.

9. A tool as set forth in claim 8 further comprising a capacitor connected between the center of said conductor and said ground conductor.

10. A tool as set forth in claim 8 further comprising capacitors respectively connected between said first and second prongs and said ground conductor.

11. A tool for shunting RF signals and AC power between ports of a multi-tap comprising:

a housing;

a first member of insulating material;

a first conductive prong mounted in said first member;

first metallic spring fingers mounted about said first member;

a second member of insulating material;

a second conductive prong mounted in said second member;

second metallic spring fingers mounted about said second member;

a circuit board mounted within said housing;

a conductive surface on said circuit board;

means for mounting said first and second insulating members on said circuit board so that said first and second prongs extend beyond said housing;

means for connecting said first and second spring fingers to said conductive surface; and a conductor spaced from said conductive surface and connected between said first and second prongs.

12. A tool as set forth in claim 11 further comprising:

a capacitor connected between the center of said conductor and said conductive surface.

13. A tool as set forth in claim 11 further comprising:

a first capacitor connected between said first prong and said conductive surface; and a second capacitor connected between said second prong and said conductive surface.

14. A tool as set forth in claim 11, wherein a substantial portion of said housing between said first and second insulating members is flexible, and said circuit board therebetween is flexible, thereby permitting said tool to be connected between input and output ports of a multi-tap housing.

15. A low capacitance probe comprising:

a body member of insulating material having first and second ends;

means defining a central opening between said first and second ends of said body member;

a hollow conductive member mounted in said central opening;

a compression spring mounted within said hollow conductive member adjacent said first end of said body member;

a probe of conductive material having a portion within said conductive member that is in contact with said spring, and a portion extending beyond the second end of said body member;

a plurality of spring fingers at least one of which is conductive;

means for mounting said spring fingers about said body member so that they are substantially parallel to said central opening;

said first end of said body member being radially enlarged and divided into a plurality of segments having spaces between them;

said hollow conductive member protruding from the first end of said body member; and said means for mounting said spring fingers including a band of conductive material in contact with said body member and adjacent its enlarged first end and strips of conductive material extending from said band through said spaces between said segments.

16. A low capacitance probe as set forth in claim 15 wherein said second end of said body member is enlarged.

* * * * *